US011073972B2

(12) United States Patent
Lim et al.

(10) Patent No.: US 11,073,972 B2
(45) Date of Patent: Jul. 27, 2021

(54) VISUAL SUMMARIZATION METHODS FOR TIME-STAMPED IMAGES

(71) Applicant: Motorola Solutions, Inc., Chicago, IL (US)

(72) Inventors: Grace Wei Wen Lim, Bukit Mertajam (MY); Yan Pin Ong, Bukit Mertajam (MY)

(73) Assignee: Motorola Solutions, Inc., Chicago, IL (US)

( * ) Notice: Subject to any disclaimer, the term of this patent is extended or adjusted under 35 U.S.C. 154(b) by 123 days.

(21) Appl. No.: 16/179,583

(22) Filed: Nov. 2, 2018

(65) Prior Publication Data

US 2020/0142567 A1 May 7, 2020

(51) Int. Cl.
*G06F 3/0484* (2013.01)
*G06F 3/0482* (2013.01)
*G06T 11/60* (2006.01)
*G06F 16/51* (2019.01)
*G06F 16/54* (2019.01)
*G06F 16/58* (2019.01)
*G06F 40/169* (2020.01)

(52) U.S. Cl.
CPC ........ *G06F 3/04845* (2013.01); *G06F 3/0482* (2013.01); *G06F 16/51* (2019.01); *G06F 16/54* (2019.01); *G06F 16/5866* (2019.01); *G06F 40/169* (2020.01); *G06T 11/60* (2013.01)

(58) Field of Classification Search
CPC .... G06F 3/04845; G06F 40/169; G06F 16/51; G06F 16/54; G06F 16/5866; G06F 3/0482; G06T 11/60
See application file for complete search history.

(56) References Cited

U.S. PATENT DOCUMENTS

| 2002/0171669 | A1* | 11/2002 | Meron | G06F 16/78 345/619 |
| 2006/0041564 | A1* | 2/2006 | Jain | G06F 16/907 |
| 2007/0271297 | A1* | 11/2007 | Jaffe | G06K 9/6219 |
| 2008/0303901 | A1* | 12/2008 | Variyath | H04N 5/77 348/143 |
| 2009/0161962 | A1* | 6/2009 | Gallagher | G06K 9/6211 382/203 |
| 2013/0266181 | A1* | 10/2013 | Brewer | G06K 9/00295 382/103 |

(Continued)

*Primary Examiner* — Stephen S Hong
*Assistant Examiner* — Ahamed I Nazar
(74) *Attorney, Agent, or Firm* — Baker Botts L.L.P.

(57) ABSTRACT

Disclosed is an exemplary method of providing a visual summarization of a plurality of time-stamped annotated images. The method includes receiving the plurality of time-stamped annotated images. The plurality of time-stamped annotated images includes a plurality of object-based annotations. The method includes receiving an object of interest selection (OOI selection) corresponding to at least a first object-based annotation of the plurality of object-based annotations, thereby designating an object of interest (OOI). The method includes filtering the plurality of time-stamped annotated images, based at least in part on the OOI selection, to a subset of the plurality of time-stamped annotated images, thereby creating an object of interest image group (OOI image group). The method includes generating a visual timeline for concurrently displaying the OOI image group.

20 Claims, 3 Drawing Sheets

(56) References Cited

U.S. PATENT DOCUMENTS

| | | | |
|---|---|---|---|
| 2013/0311868 A1 | 11/2013 | Monney et al. | |
| 2016/0119536 A1* | 4/2016 | Carceroni | H04N 5/23245 |
| | | | 348/207.1 |
| 2016/0203648 A1 | 7/2016 | Bilbrey et al. | |
| 2016/0253456 A1* | 9/2016 | Goede | G06F 16/5866 |
| | | | 705/3 |
| 2017/0103256 A1* | 4/2017 | Velozo | G06K 9/00228 |
| 2017/0352380 A1* | 12/2017 | Doumbouya | H04N 7/181 |

\* cited by examiner

VISUAL SUMMARIZATION METHODS FOR TIME-STAMPED IMAGES

BACKGROUND OF THE INVENTION

It may be difficult for a user to view or extract important information contained in numerous images. For example, surveillance cameras may take hours of footage with thousands of images from different vantage points. It may be difficult and time-consuming for a user to understand the relationship of the images with respect to time or location of the objects in the image, even after reviewing each image.

SUMMARY

The methods disclosed herein relate to data manipulation and editing stored image data for display on a monitor. To enable a user to easily understand information contained in a plurality of images, disclosed herein are methods of providing visual summarization of a plurality of time-stamped images. Some methods provide for visual summarization such that the user can quickly view and understand the important information contained within the plurality of time-stamped images. Some methods provide visual summarizations based on annotations made by the user. For example, the user may annotate an object with an object-based annotation each time the object appears in the plurality of time-stamped images, or each time the object is depicted doing something of interest. Visual summarizations generated based on the annotations as disclosed herein can provide enough information about the annotated objects without the unnecessary and complicating detail of numerous irrelevant images.

Disclosed is an exemplary method of providing a visual summarization of a plurality of time-stamped annotated images in accordance with some embodiments. The exemplary method includes receiving the plurality of time-stamped annotated images. The plurality of time-stamped annotated images includes a plurality of object-based annotations. A user may wish to select an object contained in the plurality of time-stamped images for visual summarization. Accordingly, the exemplary method includes receiving an object of interest selection (OOI selection) corresponding to at least a first object-based annotation of the plurality of object-based annotations, thereby designating an object of interest (OOI). A user may want to select more than one object as an OOI. The step of receiving the OOI selection corresponding to at least the first of the plurality of object-based annotations includes receiving an OOI selection corresponding to at least the first object-based annotation and a second object-based annotation of the plurality of object-based annotations. The exemplary method includes filtering the plurality of time-stamped annotated images, based at least in part on the OOI selection, to a subset of the plurality of time-stamped annotated images, thereby creating an object of interest image group (OOI image group). The step of filtering the plurality of time-stamped annotated images includes filtering based on the linked group of object-based annotations. The exemplary method includes generating a visual timeline for concurrently displaying the OOI image group. The step of generating the visual timeline may include generating a plurality of annotation summary boxes for display next to the OOI image group. The plurality of time-stamped annotated images includes images taken from different vantage points.

Some objects in the plurality of images may be related to one another. For example, a person may be associated with their car. When a user views one object in a visual summarization, the user may also want to view images containing an associated object. The exemplary method includes linking the first object-based annotation of the plurality of object-based annotations with at least a second object-based annotation of the plurality object-based annotations to create a linked group of object-based annotations.

As another example, a user may wish to have time-based annotations in addition to object-based annotations, that may provide information regarding when the annotated object is appearing in an image relative to other appearances of the annotated object in other images. The plurality of time-stamped annotated images includes a plurality of time-based annotations associated with the plurality of object-based annotations. The plurality of time-based annotations includes a first time-based annotation associated with the first object-based annotation at a first time and a second time-based annotation associated with the first object-based annotation at a second time. The first object-based annotation includes a colored shape. The first time-based annotation includes a first number. The second time-based annotation includes a second number.

To highlight a selected OOI, a user may also wish to have an additional annotation identifying an OOI. The exemplary method includes generating an object of interest annotation (OOI annotation) for display next to the OOI in the plurality of OOI images in the timeline.

In another exemplary method of providing a visual summarization of a plurality of time-stamped images, relevant, annotated images are used in the visual summarization and irrelevant, unannotated images are not used. The exemplary method includes receiving a plurality of time-stamped images, wherein the plurality of time stamped images are taken from at least two vantage points. The exemplary method includes receiving a plurality of object-based annotation selections and annotating, according to the plurality of object-based annotation selections, the plurality of time-stamped images with a plurality of object-based annotations. In the method, the plurality of object-based annotations includes a first object-based annotation and a second object-based annotation. The exemplary method includes filtering the plurality of time-stamped images into an annotated image group and an unannotated image group and generating a visual timeline for concurrently displaying the annotated image group.

A user may wish to input textual information in the images to provide detail or explanation. Accordingly, the exemplary method includes receiving a plurality of annotation summaries. The step of generating the visual timeline includes generating a plurality of annotation summary boxes for display next to the annotated image group.

In the exemplary method, the plurality of images further includes a plurality of time-based annotations associated with the plurality of object-based annotations. The plurality of time-based annotations includes a first time-based annotation associated with the first object-based annotation at a first time and a second time-based annotation associated with the first object-based annotation at a second time. In the exemplary method, the first object-based annotation includes a colored shape. The first time-based annotation includes a first number and the second time-based annotation includes a second number.

The exemplary method includes linking the first object-based annotation with at least the second object-based annotation to create a linked group of object-based annotations. The exemplary method includes generating a linked group annotation for display in the visual timeline.

A user may wish to have a visual summarization that organizes the relevant information contained in a plurality of images according to the annotations in the images, while displaying in a column each annotation that appears in the plurality of images. Such visual summarization may be a preferred manner for a user in viewing or studying the content of a plurality of time-stamped images. In yet another exemplary method of providing a visual summarization of a plurality of time-stamped annotated images, the exemplary method may include receiving the plurality of time-stamped annotated images. In this exemplary method, the plurality of time-stamped annotated images includes a plurality of object-based annotations, a first image with a first time-stamp representing a first time and a second image with a second time-stamp representing a second time. The exemplary method includes generating a table of contents with a column. The column includes the plurality of object-based annotations according to an order of appearance of the plurality of object-based annotations in the plurality of time-stamped annotated images. In the exemplary method, the plurality of object-based annotations includes a first object-based annotation corresponding to a first object and a second object-based annotation corresponding to a second object.

In the exemplary method, the first image is taken from a first vantage point and the second image is taken from a second vantage point. The first image includes at least one of the group selected from the first object-based annotation and the second-object based annotation, and the second image includes at least one of the group selected from the first object-based annotation and the second-object based annotation.

A user may also wish to view a sequence of images next to the table of contents. The exemplary method includes sending an ordered time-varying sequence of the plurality of time-stamped annotated images, for concurrent display with the table of contents. A user may also wish to understand what portion of the table of contents corresponds to an image currently being shown by the sequence of images. Accordingly, in the exemplary method, the table of contents includes a frame graphic. The frame graphic indicates which of the plurality of object-based annotations are currently being displayed in the ordered time-varying sequence.

The user may also wish to select an OOI. In the exemplary method, the plurality of time-stamped annotated images includes an object of interest image group (OOI image group). The user may wish to associate two objects. The exemplary method further includes linking a first object-based annotation of the plurality of object-based annotations with at least a second object-based annotation of the plurality object-based annotations to create a linked group of object-based annotations. The exemplary method includes generating a linked group annotation for display in the table of contents.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
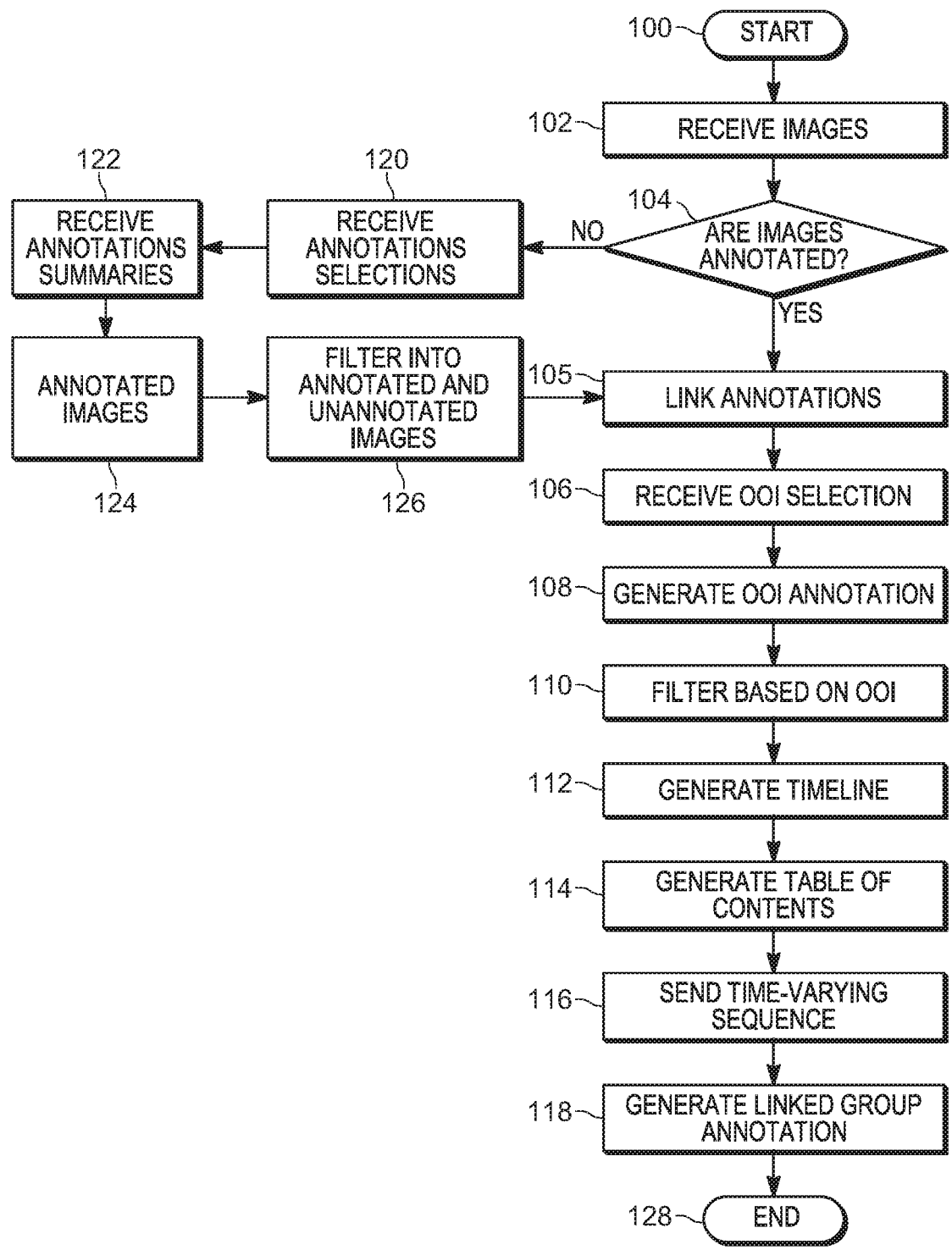
FIG. 1 is a flowchart for a method of providing a visual summarization in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The methods disclosed herein relate to data manipulation and editing stored image data for display on a monitor. When handling numerous images, it can be difficult for a user to easily process the information in a timeline. For example, an investigating officer may wish to view acquired videos or images from multiple surveillance cameras that have captured one or more images of a suspect or a victim. Additionally, the investigating officer may wish to view a sequence of events that include all actions taken by any given object of interest (OOI). For example, one surveillance camera may capture images of a suspect at certain times and another camera may capture images of the suspect at other times. For the investigating officer to more easily understand the chronology of events, the investigating officer may wish to watch a certain car, person, or other object throughout a period of time, regardless of where images depicting the car were taken. Accordingly, it may be useful to a user, such as an investigating officer, to have a visual summarization of images, so that the relevant information is easier to view and understand. Methods disclosed herein may present to a user timelines of one or more OOIs, displaying images of a particular object concurrently and chronologically against a timeline grid.

For purposes of this disclosure, nouns referred to as part of the methods disclosed herein refer not only to the noun itself, but also to the electronic representation thereof. For example, "image" includes not only a visual representation, but also an electronic representation of the visual representation, such as binary values. Accordingly, for example, "editing" an image or "annotating" an image can include editing binary values of the electronic representation of the image.

For purposes of this disclosure, a "plurality of images" and related terms includes any two or more images. The plurality of images may include still images from a single vantage point, still images from multiple vantage points, videos from a single vantage point, videos from multiple vantage points, or a combination thereof. For purposes of this disclosure, "generating" an item means producing numeric values representing the item as electronic data. For example, a microprocessor generates a visual timeline by producing numeric values representing the visual timeline.

FIG. 1 is a flowchart depicting a method of providing a visual summarization in accordance with some embodiments of the present invention. The method may include starting at step 100. At step 102, the method includes receiving a plurality of time-stamped images. The plurality of time-stamped images are electronically stored in a memory. At each subsequent step, the method includes reading from or writing to the memory. Examples of the memory include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. The plurality of time-stamped images may be received from the memory or downloaded from any electronic source. The plurality of time-stamped images may be annotated, unannotated, may have been taken from different vantage points, or a combination thereof. If the plurality of time stamped images includes annotations, the time-stamped images may include a plurality of object-based annotations. For example, an object-based annotation may be a green square highlighting a portion of the image and corresponding to an object such as a car or person. Object-based annotations make it easier for a user to identify relevant information in an image and track an object throughout multiple images.

If the time stamped images are annotated, the time-stamped annotated images may include a plurality of time-based annotations that are associated with the plurality of object-based annotations at respective times. For example, a first time-based annotation may be the number "1," indicating a first appearance of the object-based annotation in the time-stamped images. A second time-based annotation may be the number "2," indicating a second appearance of the object-based annotation in the time-stamped images. Object-based annotations and time-based annotations can be any graphical indicator used to identify the object or relative or actual time, respectively. An object-based annotation may be a color, and the time-based annotation may be part of a shape such as a circle, that gradually fills with the color based on the time.

At step 104, the method includes determining if the plurality of time-stamped images include annotations. The step of determining if the plurality of time-stamped images include annotations includes reading the plurality of time-stamped images (that is, the data representing the images). If the plurality of time-stamped images includes annotations, the method proceeds to step 105. A user may wish to link two or more objects. For example, an object such as a suitcase may be relevant to a particular suspect. The suspect and the suitcase may appear together in some images and separately in other images, but the user may wish to view images corresponding to the suitcase each time the user wants a visual summarization of the suspect. One way to achieve such a summarization is to link the two objects, such that, when one appears in a summarization, so does the other. Accordingly, at step 105, the method includes linking a first object-based annotation of a plurality of object-based annotations to a second object-based annotation of the plurality of object-based annotations. The link may be input by the user or may be generated automatically based on the two or more objects appearing frequently in the same images. The link is a pointer from a location in the memory to another location in the memory, associating the first object-based annotation of the plurality of object-based annotations to the second object-based annotation of the plurality of object-based annotations.

If the plurality of time-stamped images includes annotations, the method includes receiving an OOI selection at step 106, thereby designating an object as an OOI. The receiving an OOI selection allows a user, software, or a combination thereof to select an object in the plurality of time-stamped images that the user may wish to view or study. There may be numerous annotated objects throughout the plurality of time-stamped images. Several people may be relevant in images that are taken from surveillance cameras, such as numerous suspects. Each of the suspects may have a corresponding object-based annotation. An OOI selection can correspond to one or more objects, such as one or more of the subjects. By receiving an OOI selection, the methods can generate visual summarizations based on the OOIs, as described later, thereby presenting information that the user wishes to view or study without cluttering the relevant images with unnecessary additional information.

To allow a user to more easily track the OOI, the method includes generating an OOI annotation at step 108. The OOI annotation is an annotation that is shown in addition to or in place of the object-based annotation for the OOI. The OOI annotation can be any graphical annotation that distinguishes the OOI from other objects. The OOI annotation may be displayed next to the object or objects designated as the OOI. Any one or more objects may be designated as an OOI, such as a suspect.

At step 110, the method includes filtering the plurality of images based on the OOI selection. Step 110 may include filtering based on other parameters such as a range of time, removing images outside a specified time range. The filtering based on the OOI selection includes separating the plurality of images into an OOI image group and another image group, not including in the OOI image group at least some images that do not contain the OOI annotation. The OOI image group includes images for display in a timeline (generated at a later step). The OOI image group may include the images that include only the OOI annotation, the object-based annotation or the object-based annotation corresponding to the OOI, the OOI itself, or a combination thereof. The OOI image group need not include all images including the OOI annotation, the object-based annotation or the object-based annotation corresponding to the OOI, or the OOI itself—as the filtering at step 110 may include filtering based on other parameters, generating an OOI image group with less than all the images that include the OOI annotation, for example. The step of filtering may remove repetitious images that add lesser value to a visual summarization. The OOI image group, then, includes a group of images that includes less than the plurality of images, but not necessarily all of the images that include the OOI.

Figure 2:
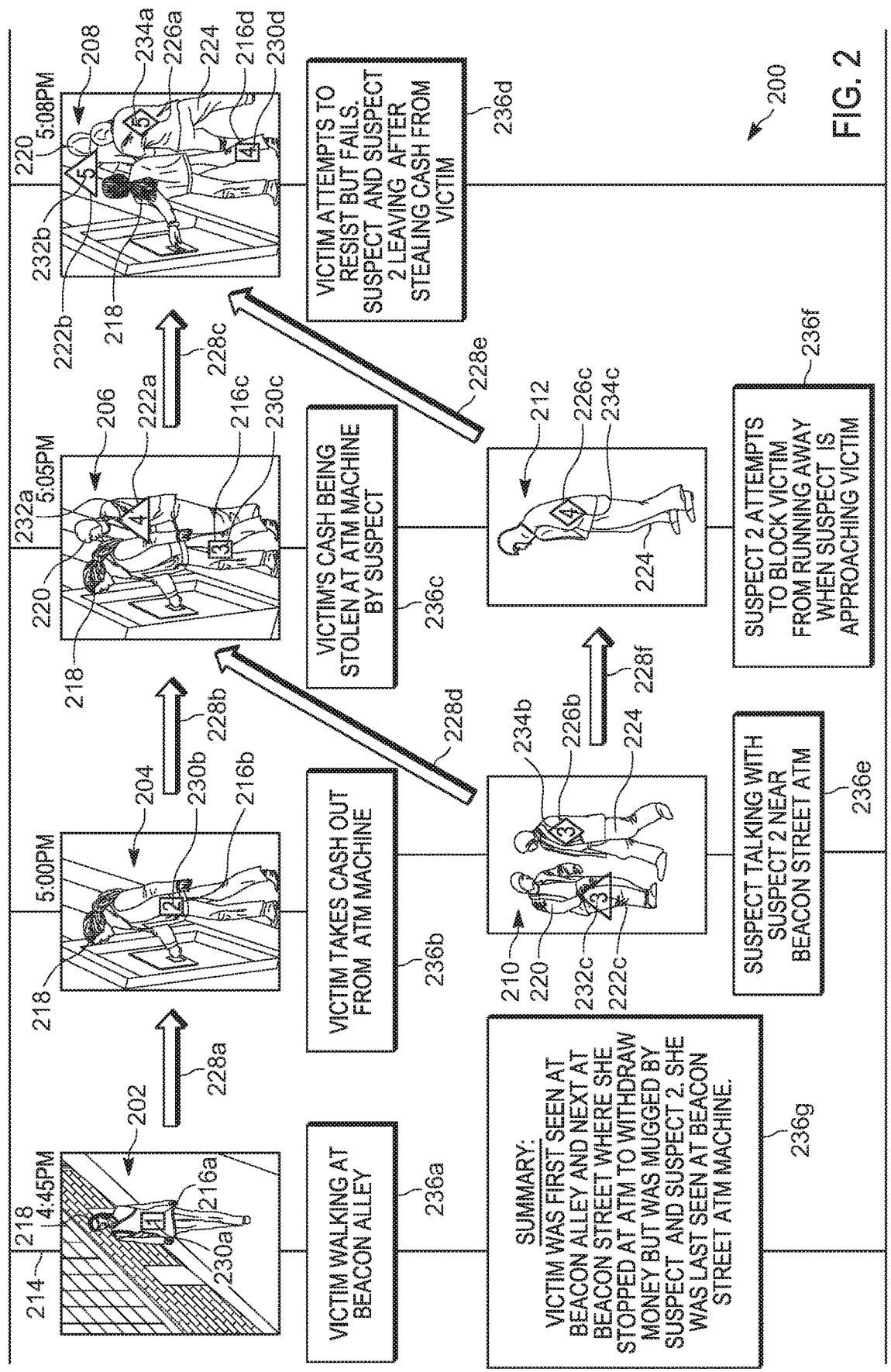
FIG. 2 is a schematic diagram of a timeline that can be generated in accordance with some embodiments.

At step 112, the method includes generating a visual timeline. The visual timeline shows either the OOI image group or an annotated image group, or a combination thereof, in chronological order. The chronological order may be depicted by displaying the images in order of time, from left to right, or top to bottom, for example. The chronological order is determined by the time-stamp of each of the time-stamped images. A user may wish to make a note of what is happening in a particular image or describe its relevance. Step 112 may include generating other visual aids, such as arrows or grids as part of the visual timeline. As an example of a visual aid, step 122 may include generating annotation summary boxes. The annotation summary boxes include text input by the user that describes what is occurring in a corresponding image, allowing the user or subsequent viewer to more easily determine what is relevant or what is happening in an image displayed in the visual timeline. An example of a generated visual timeline is shown in FIG. 2 and discussed further below.

Figure 3:
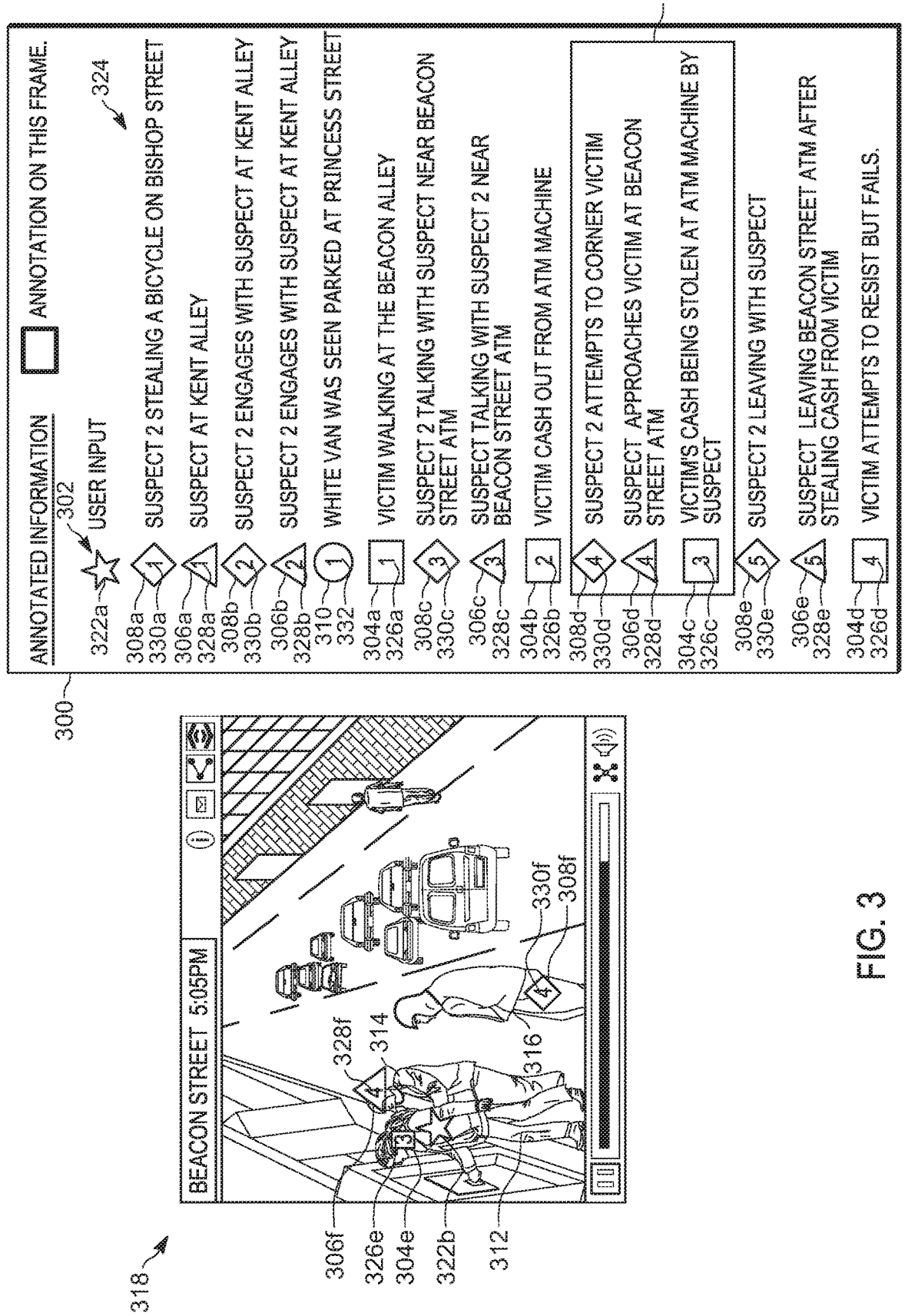
FIG. 3 is a schematic diagram of a table of contents that can be generated in accordance with some embodiments.

At step 114, the method includes generating a table of contents. The table of contents may display each of the object-based annotations in an order of appearance. For example, assume a first object-based annotation appears in a first image with a time stamp of 4:45 PM and in a second image with a time stamp of 5:05 PM. Assume also that a second object-based annotation appears in a third image with a time stamp of 5:00 PM. An exemplary table of contents will display the first object-based annotation (corresponding to 4:45 PM), the second-object based annotation (corresponding to 5:00 PM), then again the first object-based annotation (corresponding to 5:05 PM). An example of a table of contents is shown by FIG. 3 and discussed further below.

At step 116, the method includes sending an ordered time-varying sequence of the plurality of time-stamped annotated images for concurrent display with the table of contents. The time-varying sequence can be sent to a processor, the memory, a display, etc., to ultimately display the time-varying sequence with the table of contents. The time-varying sequence may be a video, a slide show, or a combination thereof containing the plurality of time-stamped images. As the time-varying sequence changes with time, a frame graphic may display which object-based annotations in the table of contents are currently being displayed in the time-varying sequence. For example, the frame graphic may be a box that surrounds a first object-based annotation and a second object-based annotation that are currently being shown in the time-varying sequence. An example of a time-varying sequence and a frame graphic are depicted by FIG. 3 and are further discussed in reference to FIG. 3, below.

A user may want to associate two or more objects and annotate the two or more objects with a linked group annotation that identifies the two or more objects as part of a linked group. At step 118, the method includes generating a linked group annotation. The linked group annotation can be any graphical annotation that distinguishes a linked group from other objects not in the linked group, such as colors, shapes, numbers, letters, words, and the like.

If at step 104, it is determined that the plurality of time-stamped images does not include annotations, the method includes receiving annotation selections at step 120. The annotation selections may be input by a user, received from the memory or electronic download, or a combination thereof. The annotation selections are instructions regarding which object to annotate, how to annotate, or both. For example, the annotation selections may include instructions to annotate a certain object in a certain image with a certain graphic. The annotation selections may also include instructions regarding time-based annotations, including for example, a number to associate with any of the object-based annotations. The annotation selections may also include settings for the type of object-based annotation (color, shape, text, size of text, etc.) and settings for the type of time-based annotation (relative time, actual time, color, shape, text, size of text, etc.).

To provide descriptions of one or more images, the method includes receiving annotation summaries at step 122. The annotation summaries may be input by a user, received from the memory or electronic download, or a combination thereof. The annotation summaries may be included in annotation summary boxes as part of a generated visual timeline. The annotation summaries include text which may be descriptive of one or more images.

At step 124, the method includes annotating images according to the plurality of object-based annotation selections. The annotating includes adding a plurality of object-based annotations and a plurality of time-based annotations to the plurality of time-based images. When an object-based annotation appears in multiple images, the time-based annotations can be auto-populated for each of the plurality of object-based annotations.

To filter the plurality of images to remove irrelevant images, the method includes filtering the plurality of images into an annotated group and an unannotated group at step 126. The annotated image group may include only the images that include one or more object-based annotations. The annotated image group includes images for display in a visual timeline. The annotated image group need not include all images including an object-based annotation—as the filtering at step 122 may include filtering based on other parameters, generating an annotated image group with less than all the images that include an object-based annotation, for example. The filtering may remove repetitious images that add lesser value to a visual summarization. The annotated image group, then, includes a group of images that includes less than the plurality of images, but not necessarily all of the images that include object-based annotations. The method includes ending at step 128.

FIG. 2 depicts a visual summarization in accordance with some embodiments. Specifically, FIG. 2 displays a timeline 200 of video surveillance footage. The timeline 200 is arranged such that an annotated image 202 is displayed concurrently with an annotated image 204, an annotated image 206, an annotated image 208, an annotated image 210, and annotated image 212. The annotated images 202 through 212 are time-stamped, meaning that each has a time associated with each image. Time-stamp information can be contained in metadata or input by a user. The annotated images 202 through 212 are displayed against a time grid 214, according to the time in which each respective image was captured. For example, the annotated image 202 was captured at 4:45 PM. The annotated image 202 was taken from a first vantage point, from a first camera in an alley. The annotated images 204 through 212 were taken at a second vantage point from a second camera.

In accordance with some embodiments, after receiving a plurality of images, a user, software, or a combination thereof may annotate some or all of the plurality of images to create a plurality of object-based annotations. Object-based annotations make it easier for a user to determine what is relevant in an image and the location of the relevant portion of the image. The annotated image 202 is shown with a first object-based annotation 216a. The first object-based annotation 216a is object-based as it corresponds to an object—a victim 218. "First" and like terms are used merely for discussion purposes to distinguish object-based annotations corresponding to one object from other objects later described. For example, any "first" object-based annotation refers to the victim 218. The annotated image 202 shows the victim 218 walking down an alley.

The annotated image 204 shows the victim 218 withdrawing cash at 5:00 PM. A first object-based annotation 216b, corresponding to the victim 218, appears in the annotated image 204. Next, the annotated image 206 shows a suspect 220 taking cash from the victim 218. The annotated image 206 is annotated with a first object-based annotation 216c corresponding to the victim 218. The annotated image 206 also includes a second object-based annotation 222a which corresponds to the suspect 220. The annotated image 208, taken at 5:08 PM, shows the victim 218 with the first object-based annotation 216d after cash was taken by the suspect 220. The suspect 220 appears with a second object-based annotation 222b. A second suspect 224 is also shown in the annotated image 208, fleeing with the suspect 220. The second suspect 224 is annotated with a third object-based annotation 226a.

The user may want to follow the history of multiple objects. Accordingly, the timeline 200 may be used to display objects that diverge, appear in different images at the same or different times, or a combination thereof. The timeline 200 concurrently displays the annotated image 210 and the annotated image 212, which each do not show the victim 218. The image 210 shows the suspect 220 with a second object-based annotation 222c and the second suspect 224 with a third object-based annotation 226b. The suspect 220 and the second suspect 224 are talking at 5:00 PM. Between 5:00 PM and 5:05 PM the suspect 220 and the second suspect 224 diverge, with the suspect 220 next appearing near the victim 218 in the annotated image 206 and the second suspect 224 staying still and appearing in the annotated image 212 with a third object-based annotation 226c at 5:05 PM. Arrows 228a through 228f are included in the timeline 200 to show paths of the victim 218, the suspect 220, and the second suspect 224.

To further help the user follow the sequence of events, visual summarization may include time-based annotations. Time-based annotations may indicate an order of appearance of a particular object in the image, such as how many times the object has thus far appeared at a given time. In the image 202, the time-based annotation 230a is associated with the object-based annotation 216a. From the image 202 to the image 204, the first object-based annotations 216a and 216b appear because the same object, the victim 218, is present in both images. To indicate an order of appearance or a change of time, the time-based annotation 230a, "1," in the image 202, is replaced with the time-based annotation 230b, "2," in image the image 204. The time-based annotation 230a, "1," indicates a first appearance of the victim 218 and the time-based annotation 230b, "2," indicates a second appearance of the victim 218. Such time-based annotations allow for a user to easily track a sequence of events or an order of appearance of a particular object.

A time-based annotation 230c and a time-based annotation 230d are shown associated with the first object-based annotation 216c of the victim 218 in the annotated image 206 and the first object-based annotation 216d of the victim 218 the annotated image 208, respectively. A time-based annotation 232a, a time-based annotation 232b, and a time-based annotation 232c are shown associated with the second object-based annotations 222a through 222c of the suspect 220 in the images 206, 208, and 210 respectively. A time-based annotation 234a, a time-based annotation 234b, and a time-based annotation 234c are shown associated with the third object-based annotations 226a through 226c of the second suspect 224 in the images 208, 210, and 212, respectively.

Time-based annotations may be used to indicate the order of appearance of a respective associated object-based annotation in a set of images, not necessarily in the images that are used in a timeline. For example, the time-based annotation 232c appears next to the suspect 220 and the second object-based annotation 222c. The time-based annotation 232c is the first-appearing time-based annotation for the suspect 220 in the timeline 200 but is depicted with the number "3." Time-based annotation 232c is a "3" instead of a "1" in this embodiment because a second object-based annotation appeared in two other images or sets of images that were annotated but ultimately not included in the timeline 200. As the present disclosure allows for generation of multiple visualization summaries, previously occurring time-based annotations, e.g. "1" and "2" for the suspect 220, may occur in other visualization summaries or images even though not displayed by the example timeline 200.

Given a set of images, with a number of annotations, a user may want to view only a subset of images pertaining to one or more objects. For example, the user may want to track a specific car or a suspect and not be presented with all of the information contained by all of the set of images, not all of which include the specific car or suspect. In accordance with some embodiments, a set of images can be filtered based on an OOI selection. An OOI can be any one or more objects displayed or annotated by object-based annotations.

The timeline 200 shows three annotated objects: the victim 218, the suspect 220, and the second suspect 224. The timeline 200 was generated from a set of images beyond those shown by FIG. 2. The set of images may include other annotated objects not shown in timeline 200. The timeline 200 was generated after a user, software, or combination thereof selected an object of interest (OOI). An OOI may include any one or more objects. In the timeline 200, the victim 218, the suspect 220, and the second suspect 224 were selected and are an OOI. Accordingly, the annotated images 202 through 212 in timeline 200 can also be collectively referred to as an OOI image group as each contains an OOI or a portion thereof. Other images in the set of images that do not include at least part of the OOI are not OOI images and are not shown by timeline 200. This way, a set of images can be filtered based on an OOI selection to include only an OOI image group, such that the user can follow whatever object the user is interested in. Either the victim 218, the suspect 220, the second suspect 224, or a combination thereof appear in each of the annotated images 202 through 212 of the OOI image group. After a user or software selects one or more OOIs, the user or the software can then additionally add other images without the OOI. Additional images may be desired for context, for example. Filtering based on the OOI does not necessarily filter to every image containing the OOI. For example, some OOI images may be filtered out concurrently or at another step because some OOI images may be repetitive or otherwise not useful for timeline display. Additionally, images may be filtered out according to time. The user may have selected a timeline for images occurring between 4:45 PM and 5:08 PM, filtering out other images were taken before 4:45 PM or after 5:08 PM.

The user may want to provide a description of each of the annotated images 202 through 212. The timeline 200 may include annotation summary boxes 236a through 236g. The user may input the annotation summary boxes 236a through 236g while viewing the timeline 200 or while viewing the images before visual summarization. The annotation summary boxes 236a through 236g further allow the information contained in the images 202 through 212 to be more easily understandable.

FIG. 2 shows simply one embodiment of a timeline for one type of images. A timeline may be customized in a number of ways. For example, a timeline may be customized by the images used, the OOIs selected, the number of OOIs selected, repetitive image filtering, the number of object-based and time-based annotations, the size of the OOI group, the number of columns, time-based filtering, vantage-point or camera-based filtering, and so forth. Although the object-based annotations are shown by shapes and the time-based annotations are shown by numbers, the object-based annotations and the time-based annotations can be any one or more of shapes, colors, shapes, numbers, letters, words, and the like. Time-based annotations need not indicate relative times (e.g., "1" representing first appearance) and may indicate actual times (e.g., 10:30 AM). Object-based annotations may correspond to any object, not just victims and suspects. Object based annotations may be added at a single image and may be automatically carried throughout a plurality of images. A timeline can include any number of images and may be generated for a plurality of images including any other number of images.

In addition to or in lieu of the visual summarization in the form of a timeline, a user may wish to have a visual summarization that organizes the relevant information contained in a plurality of time-stamped images according to the annotations in the images, while displaying in a column each annotation that appears in the plurality of images. Such visual summarization may be a preferred manner for a user in viewing or studying the content of a plurality of time-stamped images. FIG. 3 depicts a method of providing a visual summarization of a plurality of time-stamped images in accordance with some embodiments. A table of contents 300 is shown with a column 302. The column 302 includes a first object-based annotation 304a, a first object-based annotation 304b, a first object-based annotation 304c, a first object-based annotation 304d, a second object-based annotation 306a, a second object-based annotation 306b, a second object-based annotation 306c, a second object-based annotation 306d, a second object-based annotation 306e, a third object-based annotation 308a, a third object-based annotation 308b, a third object-based annotation 308c, a third object-based annotation 308d, a third object-based annotation 308e, and a fourth object-based annotation 310. The first object-based annotations 304a through 304d correspond to a victim 312. The second object-based annotations 306a through 306e correspond to a suspect 314. The third object-based annotations 308a through 308e correspond to a second suspect 316. The fourth object-based annotation 310 corresponds to a van (not shown).

An object-based annotation appears in the table of contents 300 for the number of times that each respective object is annotated in the plurality of time-stamped images. For example, the victim 312 was annotated four times, once with each of the first object-based annotation 304a, the first object-based annotation 304b, the first object-based annotation 304c, and the first object-based annotation 304d. Accordingly each of the four first object-based annotations 304a through 304d appear in the table of contents 300.

The object-based annotations 304 through 310 are also organized according to an order of appearance. The higher on the column 302 any one object-based annotation is, the earlier the time-stamp of the time-stamped image in which the object-based annotation appears. Object-based annotations that appear in images taken at the same time are shown next to each other in the table of contents 300.

A time-varying sequence 318 of the plurality of time-stamped images is shown. As the time-varying sequence 318 varies, like a video, a slideshow, or a combination thereof, a frame graphic 320 will indicate which annotations shown in the table of contents 300 are currently being shown in the time-varying sequence 318. The time-varying sequence 318 is currently showing the victim 312 with a first object-based annotation 304e, the suspect 314 with a second object-based annotation 306f, and the second suspect 316 with a third object-based annotation 308f.

In the table of contents 300, the frame graphic 320 encompasses the first object-based annotation 304c, the second object-based annotation 306e, and the third object-based annotation 308d, thereby indicating that a first object-based annotation 304e, a second object-based annotation 306f, and a third object-based annotation 308f are currently shown in the time-varying sequence 318. As the time-varying sequence 318 changes with time, the location of the frame graphic 320 will also change. For example, when the time-varying sequence 318 changes to a next image, the frame graphic 320 will move down in the column 302 and adjust in size to the extent needed to encompass each object-based annotation, if any, appearing in the next image. The frame graphic 320 may also be hidden if no object-based annotation appears.

An OOI annotation 322a also appears in the table of contents 300 to indicate that an OOI is selected—here, the victim 312. An OOI annotation 322b appears in the time-varying sequence 318 on the victim 312. As similarly discussed above with respect to other visual summarizations, the timeline 300 can be generated based on an OOI selection. For example, the table of contents 300 may include only object-based annotations from images that contain an OOI.

For more in-depth description of the time-stamped images, the table of contents 300 includes a plurality of text entries 324. The user may input text for each of the plurality of text entries 324 while viewing the table of contents 300. Additionally or alternatively, text for the plurality of text entries 324 may be generated automatically, pulled from earlier input by the user, including input by the user in other visual summarizations, or a combination thereof.

Time-based annotations may also be useful to orient and organize the information displayed to the user. Accordingly, a plurality of time-based annotations 326a through 326e are associated with the first object-based annotations 304a through 304e, respectively. A plurality of time-based annotations 328a through 328f are associated with the second object-based annotations 306a through 306f, respectively. A plurality of time-based annotations 330a through 330f are associated with the third object-based annotations 308a through 308f, respectively. A time-based annotation 332 is associated with the object-based annotation 310.

The time-based annotations 326a through 332 indicate an order of appearance of each respective object-based annotation. For example, the time-based annotation 326a with a value of "1" is associated with the first-object based annotation 304a, indicating a first appearance of any first-object-based annotation. The time-based annotation 326b with a value of "2" is associated with the first-object based annotation 304b, indicating that the first-object based annotation 326b is the second appearance of any first-object-based annotation.

The table of contents 300 can be configured in a number of ways and is included merely as an example. In other examples, the column can be scrollable and horizontal, vertical, circular, or any other manner that can be used to show a linear sequence. A linked group annotation, as described above, may also be displayed in the table of contents and time-varying sequence.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of providing a visual summarization of a plurality of time-stamped annotated images, the method comprising:
   receiving the plurality of time-stamped annotated images, the plurality of time-stamped annotated images comprising a plurality of object-based annotations, each object-based annotation comprising a graphical indicator that has been added to and appears in one or more of the plurality of time-stamped annotated images and is usable to identify a corresponding object that appears in the one or more of the plurality of time-stamped annotated images;
   receiving an object of interest selection (OOI selection) corresponding to at least a first object-based annotation of the plurality of object-based annotations, thereby designating a corresponding first object as an object of interest (OOI);
   filtering the plurality of time-stamped annotated images, based at least in part on the OOI selection and the plurality of object-based annotations, to create a subset of the plurality of time-stamped annotated images, the subset representing an object of interest image group (OOI image group) in which each image includes the designated OOI and the first object-based annotation; and
   generating a visual timeline in which the time-stamped annotated images in the OOI image group, including the first object-based annotation, are concurrently displayed.

2. The method of claim 1, wherein the plurality of time-stamped annotated images comprises images taken from different vantage points.

3. The method of claim 1, wherein:
   the method further comprises linking the first object-based annotation of the plurality of object-based annotations with at least a second object-based annotation of the plurality object-based annotations to create a linked group of object-based annotations; and
   the filtering the plurality of time-stamped annotated images comprises filtering based on the linked group of object-based annotations.

4. The method of claim 1, wherein the receiving the OOI selection corresponding to at least the first of the plurality of object-based annotations comprises receiving an OOI selection corresponding to at least the first object-based annotation and a second object-based annotation of the plurality of object-based annotations.

5. The method of claim 1, wherein the generating the visual timeline comprises generating a plurality of annotation summary boxes for display next to respective images in the OOI image group.

6. The method of claim 1, wherein the plurality of time-stamped annotated images further comprises a plurality of time-based annotations each of which has been added to and appears in one or more of the plurality of time-stamped annotated images and is associated with one or more of the plurality of object-based annotations, the plurality of time-based annotations comprising a first time-based annotation associated with the first object-based annotation at a first time and a second time-based annotation associated with the first object-based annotation at a second time.

7. The method of claim 6, wherein:
the first object-based annotation comprises at least one colored shape;
the first time-based annotation comprises a first number; and
the second time-based annotation comprises a second number.

8. The method of claim 1, further comprising generating an object of interest annotation (OOI annotation) for display next to the OOI in each of the OOI images in the OOI image group displayed in the timeline.

9. A method of providing a visual summarization of a plurality of time-stamped images, the method comprising:
receiving a plurality of time-stamped images, the plurality of time stamped images taken from at least two vantage points;
receiving a plurality of object-based annotation selections;
annotating, according to the plurality of object-based annotation selections, at least a subset of the plurality of time-stamped images to add a plurality of object-based annotations to the at least the subset of the plurality of time-stamped images, wherein:
each object-based annotation comprises a graphical indicator that is usable to identify a corresponding object that appears in one or more of the time-stamped images in the at least the subset of the plurality of time-stamped images;
each object-based annotation is generated for display with the one or more of the time-stamped images; and
the plurality of object-based annotations comprises a first object-based annotation and a second object-based annotation;
filtering, based on the annotating, the plurality of time-stamped images into an annotated image group in which each image includes at least the first object-based annotation or the second object-based annotation and an unannotated image group; and
generating a visual timeline in which the time-stamped images in the annotated image group, including the first and second object-based annotations, are concurrently displayed.

10. The method of claim 9, wherein:
the method further comprises receiving a plurality of annotation summaries; and
the generating the visual timeline comprises generating a plurality of annotation summary boxes for display next to respective images in the annotated image group.

11. The method of claim 9, wherein the plurality of time-stamped images further comprises a plurality of time-based annotations each of which has been added to and appears in one or more of the plurality of time-stamped images and is associated with one or more of the plurality of object-based annotations the plurality of object-based annotations, the plurality of time-based annotations comprising a first time-based annotation associated with the first object-based annotation at a first time and a second time-based annotation associated with the first object-based annotation at a second time.

12. The method of claim 11, wherein:
the first object-based annotation comprises at least one colored shape;
the first time-based annotation comprises a first number; and
the second time-based annotation comprises a second number.

13. The method of claim 9, wherein the method further comprises:
linking the first object-based annotation with at least the second object-based annotation to create a linked group of object-based annotations; and
generating a linked group annotation for display in the visual timeline.

14. A method of providing a visual summarization of a plurality of time-stamped annotated images, the method comprising:
receiving the plurality of time-stamped annotated images, the plurality of time-stamped annotated images comprising:
a plurality of object-based annotations, each object-based annotation comprising a graphical indicator that has been added to and appears in one or more of the plurality of time-stamped annotated images and is usable to identify a corresponding object that appears in the one or more of the plurality of time-stamped annotated images;
a first image with a first time-stamp representing a first time; and
a second image with a second time-stamp representing a second time; and
generating, based at least on the first time-stamp and the second time-stamp, a table of contents, the table of contents comprising a column in which the plurality of object-based annotations are organized for display according to an order of appearance of the plurality of object-based annotations in the plurality of time-stamped annotated images.

15. The method of claim 14, wherein the plurality of object-based annotations comprises:
a first object-based annotation corresponding to a first object; and
a second object-based annotation corresponding to a second object.

16. The method of claim 15, wherein:
the first image is taken from a first vantage point;
the second image is taken from a second vantage point;
the first image comprises at least one of the group selected from the first object-based annotation and the second object-based annotation; and
the second image comprises at least one of the group selected from the first object-based annotation and the second object-based annotation.

17. The method of claim 14, further comprising sending an ordered time-varying sequence of the plurality of time-stamped annotated images, for concurrent display with the table of contents.

18. The method of claim 17, wherein the table of contents comprises a frame graphic, the frame graphic indicating which of the plurality of object-based annotations are currently being displayed in the ordered time-varying sequence.

19. The method of claim 14, wherein the plurality of time-stamped annotated images comprises an object of interest image group (OOI image group) in which each image includes a designated object of interest.

20. The method of claim 14, wherein the method further comprises:
   linking a first object-based annotation of the plurality of object-based annotations with at least a second object-based annotation of the plurality object-based annotations to create a linked group of object-based annotations; and
   generating a linked group annotation for display in the table of contents.

\* \* \* \* \*